US008451571B2

(12) United States Patent
Imura et al.

(10) Patent No.: US 8,451,571 B2

(45) Date of Patent: May 28, 2013

(54) OVERHEAT PROTECTION CIRCUIT AND POWER SUPPLY INTEGRATED CIRCUIT

(75) Inventors: Takashi Imura, Chiba (JP); Takao Nakashimo, Chiba (JP); Masakazu Sugiura, Chiba (JP); Atsushi Igarashi, Chiba (JP); Masahiro Mitani, Chiba (JP)

(73) Assignee: Seiko Instruments Inc., Chiba (JP)

( * ) Notice: Subject to any disclaimer, the term of this patent is extended or adjusted under 35 U.S.C. 154(b) by 392 days.

(21) Appl. No.: 12/790,070

(22) Filed: May 28, 2010

(65) Prior Publication Data

US 2010/0321845 A1 Dec. 23, 2010

(30) Foreign Application Priority Data

Jun. 17, 2009 (JP) ................................ 2009-144598
Feb. 4, 2010 (JP) ................................ 2010-023387

(51) Int. Cl.
*H02H 3/00* (2006.01)

(52) U.S. Cl.
USPC .............................. 361/86; 327/513; 327/543

(58) Field of Classification Search
USPC .................................... 361/86; 327/513, 543
See application file for complete search history.

(56) References Cited

U.S. PATENT DOCUMENTS 7,038,530 B2 * 5/2006 Chou ........................... 327/543
2006/0160499 A1 * 7/2006 Puma ........................... 455/116

FOREIGN PATENT DOCUMENTS

JP 2005-100295 A 4/2005

OTHER PUBLICATIONS

Horowitz et al., The Art of Electronics, 2006, The Press Syndicate of the University of Cambridge, Second Edition, 230-232.*

* cited by examiner

*Primary Examiner* — Rexford Barnie
*Assistant Examiner* — Tien Mai
(74) *Attorney, Agent, or Firm* — Brinks Hofer Gilson & Lione

(57) ABSTRACT

Provided is a power supply integrated circuit including an overheat protection circuit with high detection accuracy. The overheat protection circuit includes: a current generation circuit including: a first metal oxide semiconductor (MOS) transistor including a gate terminal and a drain terminal that are connected to each other, the first MOS transistor operating in a weak inversion region; a second MOS transistor including a gate terminal connected to the gate terminal of the first MOS transistor, the second MOS transistor having the same conductivity type as the first MOS transistor and operating in a weak inversion region; and a first resistive element connected to a source terminal of the second MOS transistor; and a comparator for comparing a reference voltage having positive temperature characteristics and a temperature voltage having negative temperature characteristics, which are obtained based on a current generated by the current generation circuit.

5 Claims, 6 Drawing Sheets

OVERHEAT PROTECTION CIRCUIT AND POWER SUPPLY INTEGRATED CIRCUIT

RELATED APPLICATIONS

This application claims priority under 35 U.S.C.§119 to Japanese Patent Application Nos. 2009-144598 filed on Jun. 17, 2009 and 2010-023387 filed on Feb. 4, 2010, the entire contents of which is hereby incorporated by reference.

BACKGROUND OF THE INVENTION

1. Field of the Invention

The present invention relates to an overheat protection circuit that operates to suspend a circuit operation of a power supply integrated circuit in case of overheating.

2. Description of the Related Art

A power supply integrated circuit, typified by a series regulator or a switching regulator, contains an output transistor for allowing high current to flow. Accordingly, large power dissipation of the output transistor and insufficient heat dissipation of the integrated circuit involve a danger of smoke or fire due to overheating. For that reason, the power supply integrated circuit that handles high current is provided with a built-in overheat protection circuit for ensuring safety.

A widely-used example of the built-in overheat protection circuit for a power supply circuit is disclosed in Japanese Patent Application Laid-open No. 2005-100295 (FIG. 3).

A general overheat protection circuit employs a diode as a thermal element to utilize forward voltage temperature characteristics of the diode. In a case of using a parasitic diode to be formed through a CMOS process, a forward voltage of the diode is determined based on a bandgap voltage of silicon and has a temperature coefficient of approximately −2 mV/° C. independently of a process, and hence the diode is suitable for a thermal element on an integrated circuit.

Comparing an output of the thermal element with a reference voltage having no temperature coefficient enables detection as to whether the thermal element has exceeded a given temperature or not. The reference voltage is set to be equal to a voltage that is output from the thermal element at a temperature to be determined as overheat. The overheat protection circuit is configured to turn OFF an output transistor when overheat is detected based on the magnitude relation between the output voltage of the thermal element and the reference voltage.

FIG. 2 illustrates a circuit diagram of a power supply integrated circuit including a conventional overheat protection circuit. The power supply integrated circuit includes a voltage regulator 100 and an overheat protection circuit 101.

The overheat protection circuit 101 includes an enhancement/depletion (E/D) type reference voltage circuit 102, a reference voltage adjustment circuit 103, and a temperature detection circuit. The E/D type reference voltage circuit 102 outputs a reference voltage Vref0, which is input to the reference voltage adjustment circuit 103. The reference voltage Vref0 is input to an inverting input terminal of a comparator 21 as a reference voltage Vref via the reference voltage adjustment circuit 103. Input to a non-inverting input terminal of the comparator 21, on the other hand, is a forward voltage Vf of a diode 20 that is biased by a constant current source 23. The forward voltage Vf of the diode 20 biased with a constant current has a negative temperature coefficient of approximately −2 mV/° C. FIG. 3 illustrates respective relations of the voltages Vf and Vref with respect to a temperature Tj (junction temperature).

If the temperature Tj is low and Vf>Vref is satisfied, a detection signal VDET of the comparator 21 becomes High to turn OFF a P-type metal oxide semiconductor (PMOS) transistor 22. Accordingly, the voltage regulator 100 operates normally.

If the temperature Tj increases and Vf<Vref is satisfied, the output level of the comparator 21 becomes Low to turn ON the PMOS transistor 22. As a result, the voltage regulator 100 enters a shutdown state.

Through the adjustment to the reference voltage by means of the reference voltage adjustment circuit 103, the voltage regulator 100 may be shut down at a desired overheat detection temperature.

However, the overheat protection circuit configured as described above involves the following problems in improving temperature detection accuracy.

The reference voltage circuit leads to an increased area. In the case of employing an E/D type reference voltage circuit as a reference voltage circuit, there is a fluctuation in reference voltage of approximately 100 mV due to a fluctuation in threshold of MOS transistors. Therefore, trimming is required in a manufacturing process so that the reference voltage may be set to a desired voltage value. Consequently, additional reference voltage adjusting means for adjusting the reference voltage needs to be provided, resulting in an increased area. Even when a high-voltage precision bandgap reference is employed as a reference voltage circuit, a large number of diode elements and an error amplifier are required, resulting in an increased area.

Further, a random offset of the comparator 21 may be responsible for a fluctuation in detection temperature. In a case where the comparator 21 is formed through a MOS process, the comparator 21 has a random offset of approximately 10 mV.

When it is supposed that the comparator 21 has a random offset of ±12 mV and the temperature coefficient of the thermal element is −2 mV/° C., the fluctuation in detection temperature due to the random offset of the comparator 21 corresponds to ±6° C. In order to reduce the fluctuation in detection temperature due to the random offset of the comparator 21, it is conceivable to reduce the random offset of the comparator 21 or increase the temperature coefficient of the thermal element. Reducing the random offset of the comparator 21 involves increasing the size of transistors constituting the comparator 21, leading to an increased area. On the other hand, increasing the temperature coefficient of the thermal element causes a large fluctuation width of the output voltage of the thermal element in a range of from room temperature to high temperature at which overheat is detected, which is disadvantageous for low voltage operation.

SUMMARY OF THE INVENTION

It is an object of the present invention to provide an overheat protection circuit configured to have a small fluctuation in detection temperature and a small occupied area, which requires no adjustment to a reference voltage after manufacturing and is suitable for low voltage operation, and a power supply integrated circuit.

In order to achieve the above-mentioned object, an overheat protection circuit according to the present invention includes: a current generation circuit including: a first metal oxide semiconductor (MOS) transistor including a gate terminal and a drain terminal that are connected to each other, the first MOS transistor operating in a weak inversion region; a second MOS transistor including a gate terminal connected to the gate terminal of the first MOS transistor, the second MOS transistor having the same conductivity type as the first MOS transistor and operating in a weak inversion region; and a first resistive element connected to a source terminal of the second MOS transistor; and a comparator for comparing a reference voltage having positive temperature characteristics and a temperature voltage having negative temperature characteristics, which are obtained based on a current generated by the current generation circuit.

The power supply integrated circuit including the overheat protection circuit according to the present invention produces an effect of reducing a fluctuation in the reference voltage while imparting positive temperature characteristics to the reference voltage so as to reduce a fluctuation in detection temperature. Besides, a reference voltage circuit is imparted with temperature characteristics opposite to those of a thermal element so that an effective temperature coefficient of the thermal element may be increased, to thereby reduce a fluctuation in detection temperature due to a random offset of the comparator.

DETAILED DESCRIPTION OF THE PREFERRED EMBODIMENTS

Now, embodiments of the present invention are described, taking as an example a power supply integrated circuit including a voltage regulator.

First Embodiment

Figure 1:
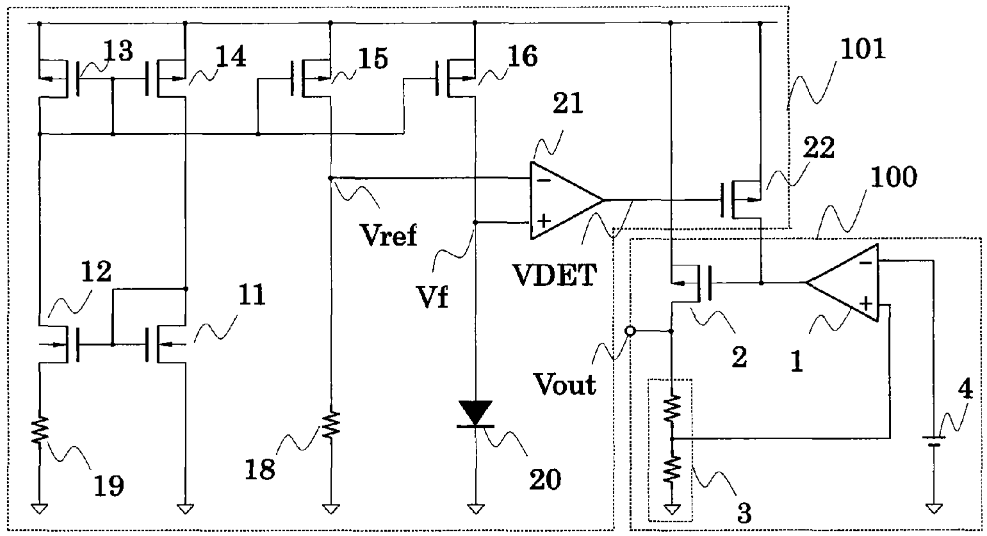
FIG. 1 is a circuit diagram illustrating a power supply integrated circuit including an overheat protection circuit according to a first embodiment of the present invention.
Figure 2:
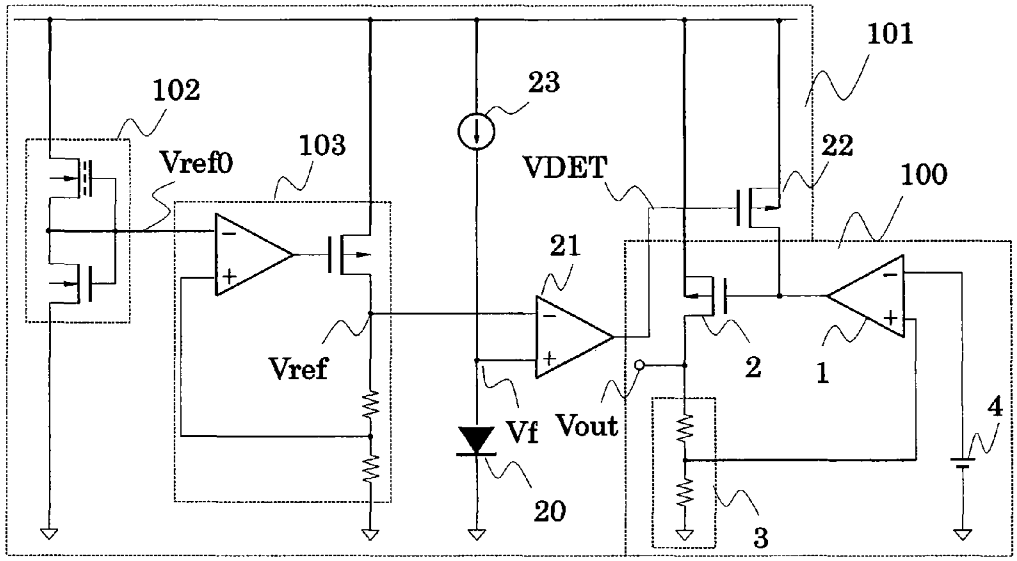
FIG. 2 PRIOR ART
FIG. 2 is a circuit diagram of a power supply integrated circuit including a conventional overheat protection circuit.

FIG. 1 is a circuit diagram of a power supply integrated circuit including an overheat protection circuit according to a first embodiment of the present invention.

The power supply integrated circuit according to this embodiment includes a voltage regulator 100 and an overheat protection circuit 101.

The voltage regulator 100 includes an error amplifier 1, an output transistor 2, voltage dividing resistors 3, and a reference voltage circuit 4. The overheat protection circuit 101 includes a reference voltage circuit and a temperature detection circuit.

The reference voltage circuit included in the overheat protection circuit 101 is configured as follows. An N-type metal oxide semiconductor (NMOS) transistor 11 has a gate terminal and a drain terminal that are connected to each other, and a source terminal connected to the ground. An NMOS transistor 12 has a gate terminal connected to the gate terminal of the NMOS transistor 11. A resistor 19 is connected between a source terminal of the NMOS transistor 12 and the ground. P-type metal oxide semiconductor (PMOS) transistors 13, 14, and 15 form a current mirror circuit. A resistor 18 is connected between a drain terminal of the PMOS transistor 15 and the ground. With this configuration, a reference voltage Vref is output from a connection point (first temperature voltage output terminal) between the resistor 18 and the PMOS transistor 15. Here, the resistor 18 and the resistor 19 have the same temperature coefficient.

The temperature detection circuit included in the overheat protection circuit 101 is configured as follows. Also a PMOS transistor 16 forms the current mirror circuit together with the PMOS transistor 13. A diode 20 serving as a thermal element is connected between a drain terminal of the PMOS transistor 16 and the ground. With this configuration, a forward voltage of the diode 20, namely a temperature voltage Vf, is output from a connection point (second temperature voltage output terminal) between the diode 20 and the PMOS transistor 16. A comparator 21 has an inverting input terminal supplied with the reference voltage Vref, and a non-inverting input terminal supplied with the temperature voltage Vf.

A PMOS transistor 22 has a gate terminal connected to an output terminal of the comparator 21, and a drain terminal connected to a gate terminal of the output transistor 2 included in the voltage regulator 100.

The power supply integrated circuit configured as described above has a function of protecting the circuit from overheating through the following operation.

The current mirror circuit supplies a current, which is determined based on a drain current of the NMOS transistor 12, to the NMOS transistor 11, the resistor 18, and the diode 20. The comparator 21 compares the reference voltage Vref and the temperature voltage Vf, and controls the PMOS transistor 22 based on the magnitude relation therebetween.

If the temperature voltage Vf is higher than the reference voltage Vref, the output level of the comparator 21 becomes High to turn OFF the PMOS transistor 22. As a result, the voltage regulator 100 operates normally. On the other hand, if the temperature voltage Vf is lower than the reference voltage Vref, the output level of the comparator 21 becomes Low (overheat detected state) to turn ON the PMOS transistor 22. As a result, the voltage regulator 100 enters a shutdown state.

Next, description is given of respective temperature characteristics of the resistor 18 and the diode 20, which affect the comparison between the reference voltage Vref and the temperature voltage Vf made by the comparator 21.

The NMOS transistor 11 and the NMOS transistor 12 each operate in a weak inversion region. In those transistors, when a gate width is represented by W; a gate length, L; a threshold voltage, Vth; a gate-source voltage, Vgs; the electron charge quantity, q; the Boltzmann's constant, k; absolute temperature, T; and constants each determined depending on a process, $Id_0$ and n, a drain current Id is calculated using Expression 1.

$$Id=Id_0(W/L)\exp\{(Vgs-Vth)q/nkT\} \quad (1)$$

When a thermal voltage is expressed by nkT/q and is represented by $U_T$, Expression 2 is established.

$$Id=Id_0(W/L)\exp\{(Vgs-Vth)/U_T\} \quad (2)$$

Accordingly, the gate-source voltages Vgs of the NMOS transistor 11 and the NMOS transistor 12 are calculated using Expression 3.

$$Vgs=U_T\ln[Id/\{Id_0(W/L)\}]+Vth \quad (3)$$

Because the PMOS transistors 13, 14, and 15 have the current mirror connection, drain currents Id3, Id4, and Id5 of the PMOS transistors 13, 14, and 15 take the same value as long as those PMOS transistors have the same aspect ratio (W/L). Further, a current Ir18 flowing through the resistor 18 and a current If flowing through the diode 20 take the same value as well.

Generated across the resistor 19 is a voltage (Vgs11−Vgs12), which is determined by subtracting the gate-source voltage Vgs12 of the NMOS transistor 12 operating in weak inversion from the gate-source voltage Vgs11 of the NMOS transistor 11 operating in weak inversion. Accordingly, based on the voltage (Vgs11−Vgsl2) and a resistance R19 of the resistor 19, a drain current Id12 is calculated, and the current Ir18 flowing through the resistor 18 is thus calculated using Expression 4.

$$Ir18=Id12=(Vgs11-Vgs12)/R19 \quad (4)$$

Accordingly, when a resistance of the resistor 18 is represented by R18, an output voltage generated across the resistor 18, that is, the reference voltage Vref is calculated using Expression 5.

$$Vref=R18Ir18=(R18/R19)(Vgs11-Vgs12) \quad (5)$$

Through Expression 3, when a gate width of the NMOS transistor 11 is represented by W11; a gate length of the NMOS transistor 11, L11; a threshold voltage of the NMOS transistor 11, Vth1; a gate width of the NMOS transistor 12, W12; a gate length of the NMOS transistor 12, L12; and a threshold voltage of the NMOS transistor 12, Vth2, and when the threshold voltages of the NMOS transistor 11 and the NMOS transistor 12 are equal to each other (Vth1=Vth2), the reference voltage Vref is calculated using Expression 6.

$$Vref=(R18/R19)U_T\ln\{(W12/L12)/(W11/L11)\} \quad (6)$$

That is, because the resistor 18 and the resistor 19 in use have the same temperature coefficient, the reference voltage Vref is determined based on the thermal voltage $U_T$, which is uniquely determined in a process, the resistance ratio (R18/R19), and the respective aspect ratios (W/L) of the NMOS transistor 11 and the NMOS transistor 12. Therefore, compared with the case where an E/D type reference voltage is employed as a reference voltage, a smaller fluctuation in reference voltage Vref due to manufacturing fluctuations is obtained at room temperature. Further, the reference voltage Vref has a positive temperature coefficient that is uniquely determined in a process.

On the other hand, a voltage-current formula for a diode is expressed by Expression 7.

$$I=Is\{\exp(Vf/mV_T)-1\} \quad (7)$$

where Is represents a saturation current of the diode, m represents a value inherent in the diode, and $V_T$ represents a thermal voltage of the diode. A forward voltage of the diode determined when the diode is applied with a constant current If that is sufficiently larger than the saturation current Is thereof, that is, the temperature voltage Vf is calculated using Expression 8.

$$Vf=\ln(If/Is)/(mV_T) \quad (8)$$

Accordingly, the current If flowing through the diode 20 is calculated using Expression 9.

$$If=(1/R19)U_T\ln\{(W12/L12)/(W11/L11)\} \quad (9)$$

As apparent from Expression 9, the current If is affected by a fluctuation in absolute value of the resistance R19. The forward voltage Vf, however, is less affected by a fluctuation in resistance because the forward voltage Vf has a logarithmic relation with the current If.

The comparator 21 therefore compares the reference voltage Vref and the temperature voltage Vf, which are not affected by a voltage relevant to manufacturing fluctuations, and outputs a binary voltage based on the magnitude relation between the reference voltage Vref and the temperature voltage Vf.

Figure 3:
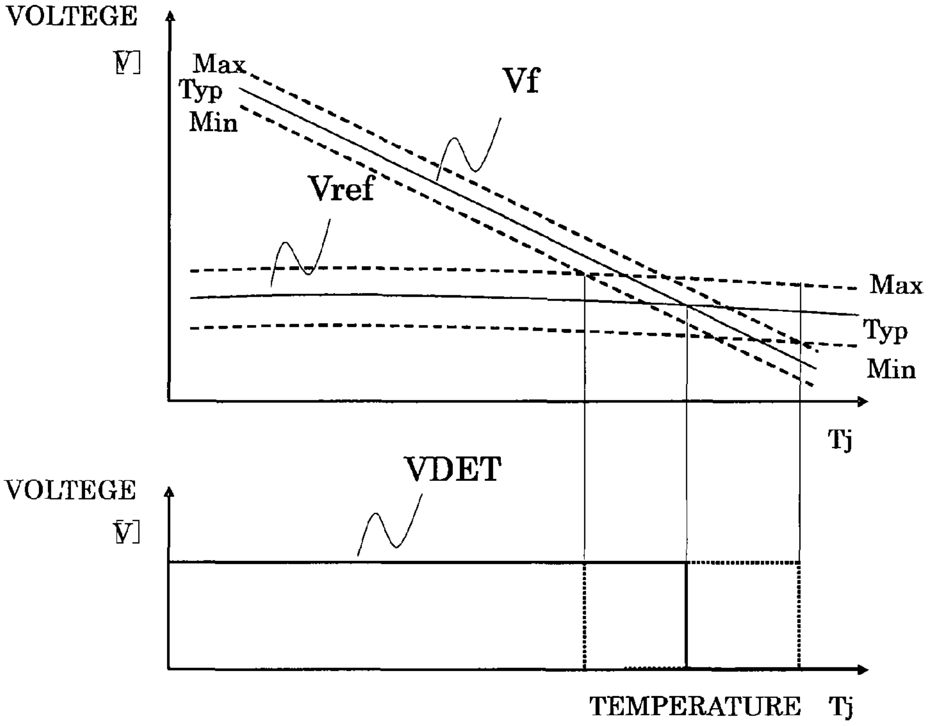
FIG. 3 PRIOR ART
FIG. 3 is a graph illustrating temperature characteristics and a fluctuation in detection temperature in the conventional overheat protection circuit.
Figure 4:
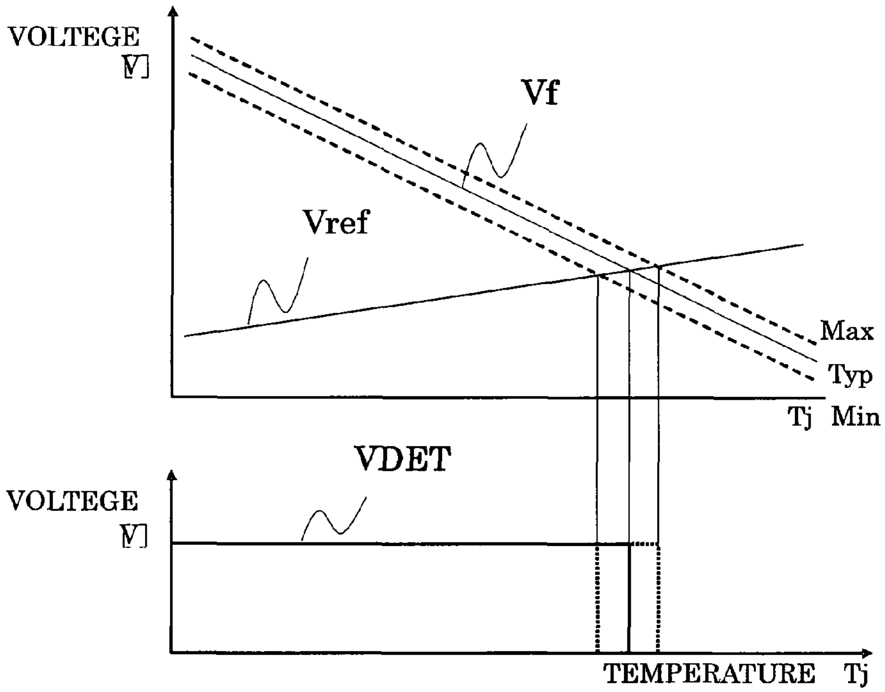
FIG. 4 is a graph illustrating temperature characteristics and a fluctuation in detection temperature in the overheat protection circuit according to the present invention.

FIG. 4 illustrates respective temperature characteristics of the reference voltage Vref, the temperature voltage Vf, and a detection signal VDET in the overheat protection circuit 101 of FIG. 1. In the overheat protection circuit 101 of FIG. 1, the reference voltage Vref has a positive temperature coefficient while the temperature voltage Vf has a negative temperature coefficient. Accordingly, with a low power supply voltage, a large value may be obtained for an apparent temperature coefficient of the thermal element, which enables to reduce a fluctuation in detection temperature, as is understood through the comparison with FIG. 3.

For example, when the temperature coefficient of the reference voltage Vref is 1 mV/° C., the temperature coefficient of the temperature voltage Vf is −2 mV/° C., and a random offset voltage of the comparator 21 is +12 mV, the apparent temperature coefficient of the thermal element is 3 mV/° C., with the result that a fluctuation in detection temperature due to a random offset may be reduced to as small as ±4° C.

Figure 5:
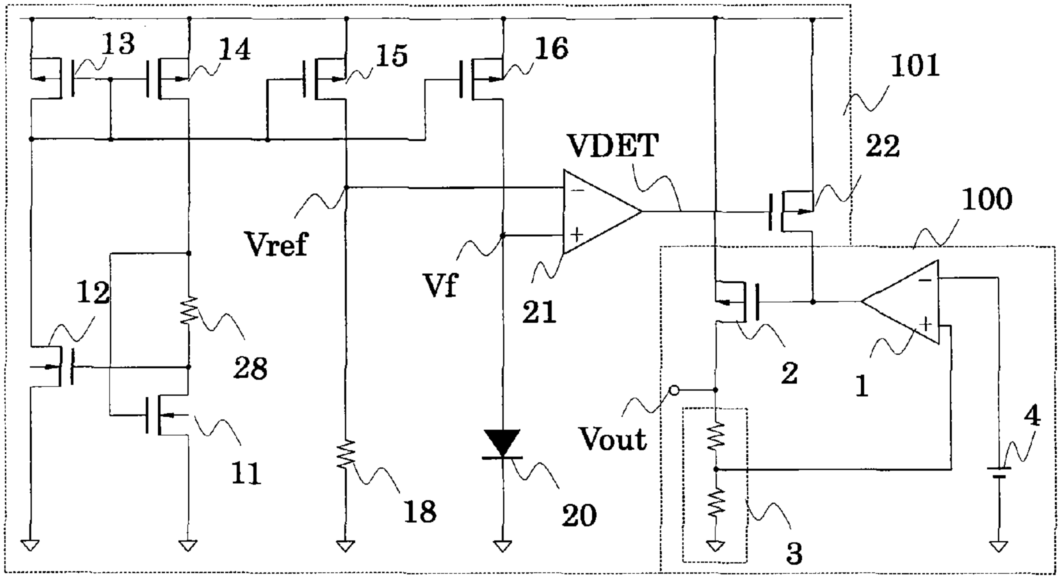
FIG. 5 is a circuit diagram illustrating another example of the overheat protection circuit according to the first embodiment of the present invention.

FIG. 5 is a circuit diagram illustrating another example of the overheat protection circuit according to this embodiment.

The overheat protection circuit of FIG. 5 includes the NMOS transistor 11, the NMOS transistor 12, and a resistor 28 in a current generation section. The resistor 28 is connected between a drain terminal of the PMOS transistor 14 and a drain terminal of the NMOS transistor 11. The NMOS transistor 11 has a gate terminal connected to the drain terminal of the PMOS transistor 14, and a source terminal connected to the ground. The NMOS transistor 12 has a gate terminal connected to the drain terminal of the NMOS transistor 11, a drain terminal connected to a drain terminal of the PMOS transistor 13, and a source terminal connected to the ground.

Irrespective of a substrate polarity, the respective source terminals and backgate terminals of the NMOS transistors 11 and 12 have the same potential, and hence the threshold voltages Vth1 and Vth2 respectively depend only on process fluctuations in the NMOS transistors 11 and 12 and not on process fluctuations in other elements.

Because the source terminal and the backgate terminal of each of the NMOS transistor 11 and the NMOS transistor 12 have the same potential, the threshold voltage Vth1 of the NMOS transistor 11 and the threshold voltage Vth2 of the NMOS transistor 12 respectively depend only on the process fluctuations in the NMOS transistor 11 and NMOS transistor 12 and not on the process fluctuations in other elements.

Therefore, a temperature-independent reference voltage Vref may be generated more stably.

Even when the current generation section of the overheat protection circuit is configured as described above, the same effect as in the circuit of FIG. 1 can be obtained.

Second Embodiment

Figure 6:
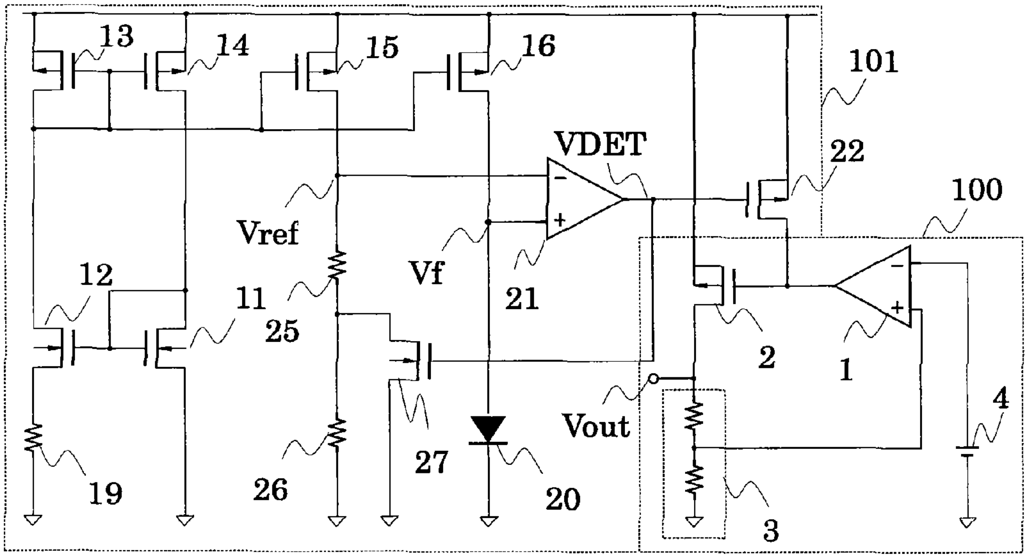
FIG. 6 is a circuit diagram illustrating a power supply integrated circuit including an overheat protection circuit according to a second embodiment of the present invention.

FIG. 6 is a circuit example of the overheat protection circuit 101 in which hysteresis is provided between a detection temperature and a release temperature.

In the overheat protection circuit 101 of FIG. 6, instead of the resistor 18, resistors 25 and 26 are connected in series and an NMOS transistor 27 is provided in parallel with the resistor 26. The NMOS transistor 27 has a gate terminal connected to the output terminal of the comparator 21.

While the output level of the comparator 21 is High, which corresponds to the normal state, the NMOS transistor 27 is turned ON. Accordingly, the reference voltage Vref in this state is calculated using Expression 10.

$$Vref=(R25/R19)(Vgs11-Vgs12) \quad (10)$$

On the other hand, while the output level of the comparator 21 is Low, which corresponds to the overheat detected state, the NMOS transistor 27 is turned OFF. The reference voltage Vref in this state is calculated using Expression 11.

$$Vref=\{(R25+R26)/R19\}(Vgs11-Vgs12) \quad (11)$$

Figure 7:
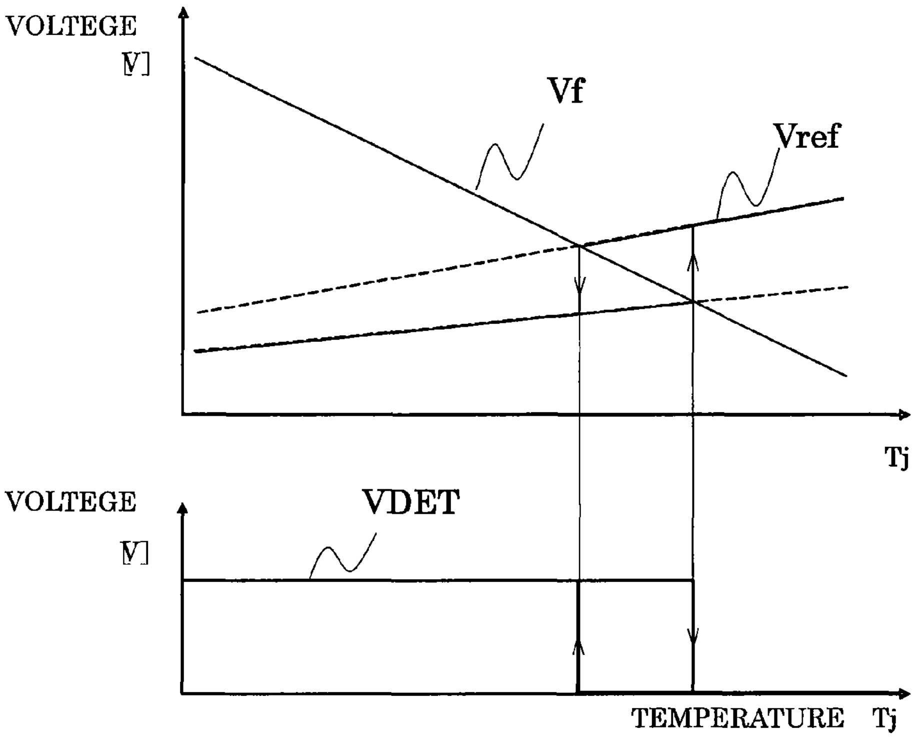
FIG. 7 is a graph illustrating relations between temperature characteristics and detection temperature in the overheat protection circuit of FIG. 6.

Therefore, as illustrated in FIG. 7, hysteresis may be provided between the detection temperature in the case of temperature increase and the release temperature in the case of temperature decrease. Also the power supply integrated circuit including the overheat protection circuit 101 configured as illustrated in FIG. 6 exhibits the same effect as in the power supply integrated circuit of FIG. 1.

Figure 8:
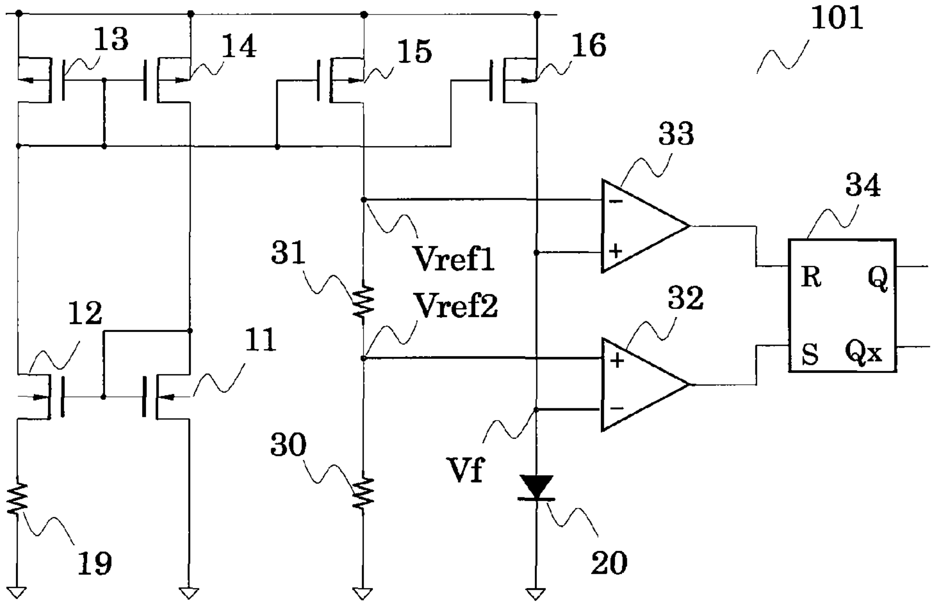
FIG. 8 is a circuit diagram illustrating another example of the overheat protection circuit of the second embodiment of the present invention.

FIG. 8 illustrates another example of the overheat protection circuit 101 in which hysteresis is provided between the detection temperature and the release temperature.

The overheat protection circuit 101 of FIG. 8 includes resistors 30 and 31 connected in series, comparators 32 and 33 for comparing voltages across the resistor 30 and across the resistors 31 and 30, namely reference voltages Vref2 and Vref1, with the temperature voltage Vf, respectively, and a latch circuit 34 for receiving respective signals input thereto from the comparators 32 and 33.

The comparator 32 has an inverting input terminal supplied with the temperature voltage Vf, and a non-inverting input terminal supplied with the reference voltage Vref2, which is generated across the resistor 30 due to a current determined based on a drain current of the NMOS transistor 12.

The comparator 33 has a non-inverting input terminal supplied with the temperature voltage Vf, and an inverting input terminal supplied with the reference voltage Vref1, which is generated across the resistor 31 and the resistor 30 due to the current determined based on the drain current of the NMOS transistor 12.

The comparator 32 outputs a comparison result to a set terminal S of the latch circuit 34. The comparator 33 outputs a comparison result to a reset terminal R of the latch circuit 34.

The reference voltages Vref1 and Vref2, which are generated across the resistors 31 and 30 and across the resistor 30, respectively, are expressed by the following expressions.

$$Vref1=\{(R30+R31)/R19\}(Vgs11-Vgs12) \quad (12)$$

$$Vref2=(R30/R19)(Vgs11-Vgs12) \quad (13)$$

Figure 9:
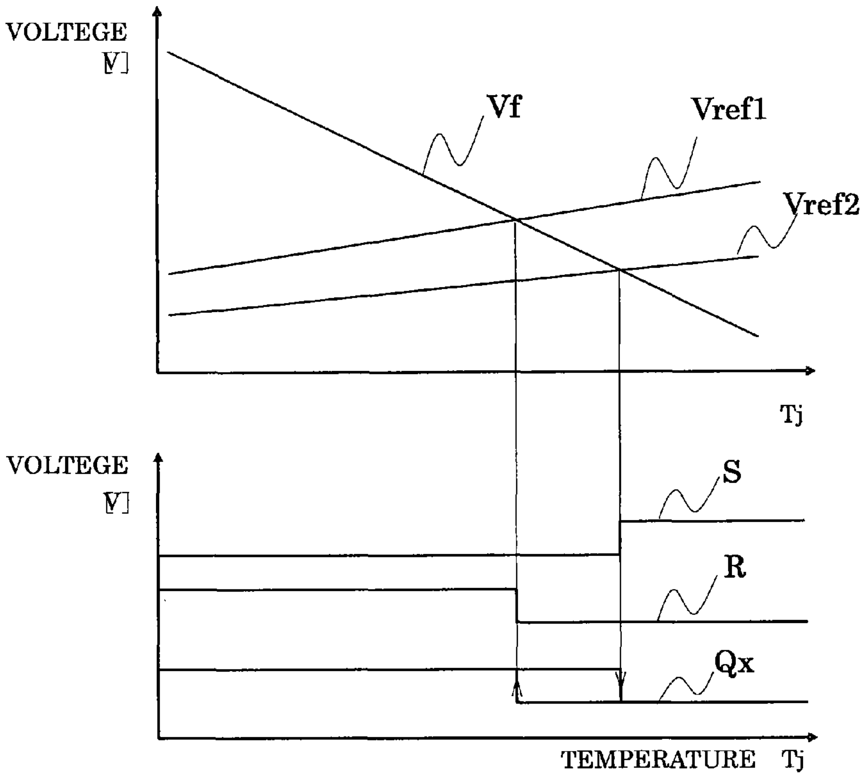
FIG. 9 is a graph illustrating relations between temperature characteristics of the overheat protection circuit of FIG. 8 and detection signals.

FIG. 9 illustrates respective relations between the temperature characteristics of the overheat protection circuit 101 of FIG. 8 and detection signals output from the latch circuit 34. If temperature increases and Vf<Vref2 is satisfied, the latch circuit 34 enters a set state where the level of an output Qx is Low. In this state, if temperature decreases and Vf≧Vref1 is satisfied, the latch circuit 34 enters a reset state where the level of the output Qx is High. In this way, as illustrated in FIG. 9, hysteresis may be provided between the detection temperature in the case of temperature increase and the release temperature in the case of temperature decrease. Also the power supply integrated circuit including the overheat protection circuit 101 configured as illustrated in FIG. 8 exhibits the same effect as in the power supply integrated circuit of FIG. 1.

Third Embodiment

Figure 10:
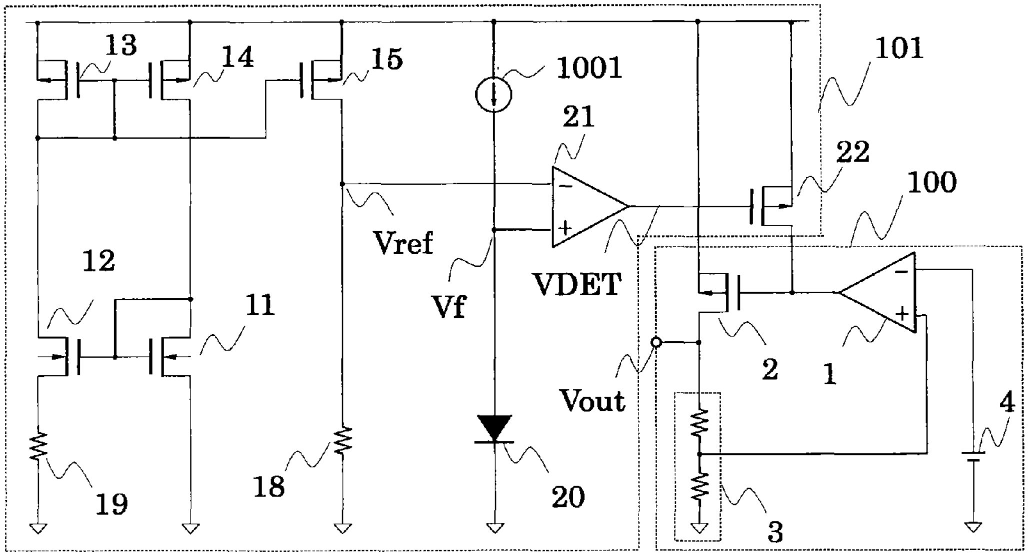
FIG. 10 is a circuit diagram illustrating a power supply integrated circuit including an overheat protection circuit according to a third embodiment of the present invention.

FIG. 10 is a circuit diagram of a power supply integrated circuit including an overheat protection circuit according to a third embodiment of the present invention.

A difference from FIG. 1 resides in that the PMOS transistor 16 is eliminated while a constant current source 1001 is added. Connection is made such that the constant current source 1001 is connected to the non-inverting input terminal of the comparator 21 and the diode 20.

Next, description is given of an operation of the power supply integrated circuit including the overheat protection circuit according to the third embodiment.

The constant current source 1001 generates a bias current that does not fluctuate irrespective of temperature. Because the constant current flowing through the diode 20 does not fluctuate irrespective of temperature, the temperature voltage Vf has a fixed inclination independently of temperature. The comparator 21 therefore compares the reference voltage Vref, which is not affected by a voltage relevant to manufacturing fluctuations, and the temperature voltage Vf, which has a fixed inclination independently of temperature. Then, the comparator 21 outputs a binary voltage based on the magnitude relation between the reference voltage Vref and the temperature voltage Vf. As a result, because both the reference voltage Vref and the temperature voltage Vf are not affected by temperature, a fluctuation in detection temperature may be further reduced.

As described above, the power supply integrated circuit including the overheat protection circuit according to the third embodiment employs a constant current source that does not fluctuate irrespective of temperature for a constant current to be allowed to flow through the diode 20, to thereby further reduce a fluctuation in detection temperature.

Fourth Embodiment

Figure 11:
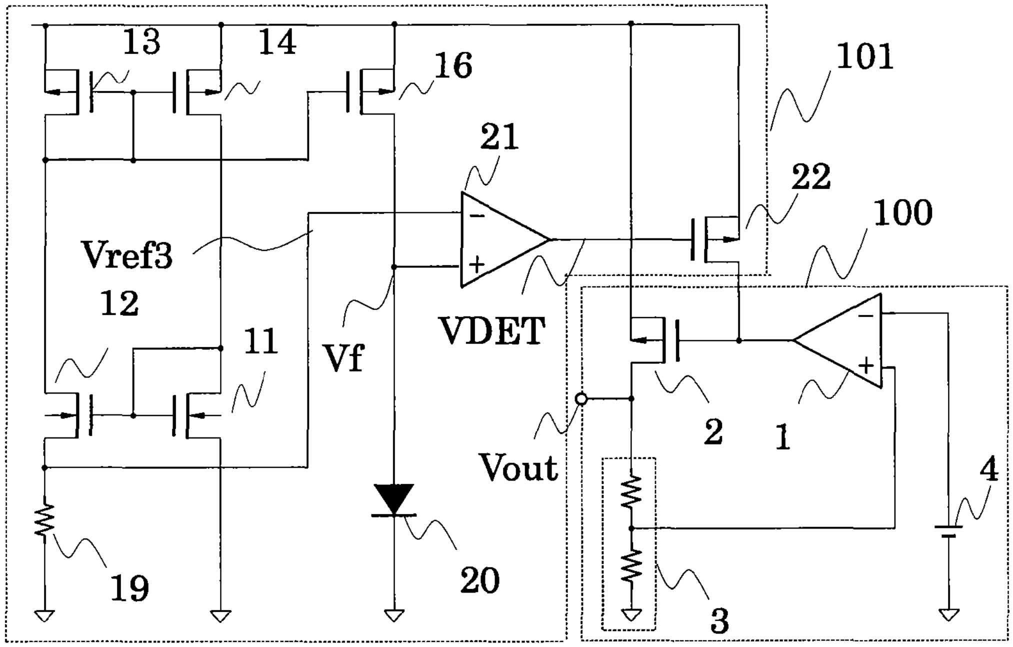
FIG. 11 is a circuit diagram illustrating a power supply integrated circuit including an overheat protection circuit according to a fourth embodiment of the present invention.

FIG. 11 is a circuit diagram of a power supply integrated circuit including an overheat protection circuit according to a fourth embodiment of the present invention.

A difference from FIG. 1 resides in that the PMOS transistor 15 and the resistor 18 are eliminated, and the inverting input terminal of the comparator 21 is connected to the source terminal of the NMOS transistor 12.

Next, description is given of an operation of the power supply integrated circuit including the overheat protection circuit according to the fourth embodiment.

A voltage Vref3 generated across the resistor 19 is expressed by the following expression.

$$Vref3=(Vgs11-Vgs12) \quad (14)$$

As expressed in Expression 14, the voltage Vref3 is determined based on the thermal temperature $U_T$, which is uniquely determined in a process, and the respective aspect ratios (W/L) of the NMOS transistor 11 and the NMOS transistor 12, without depending on resistances. Accordingly, through the adjustment to the respective aspect ratios (W/L)

of the NMOS transistor 11 and the NMOS transistor 12, the voltage Vref3 may be output as a voltage with a small fluctuation having a positive temperature coefficient. The voltage Vref3 having a positive temperature coefficient and the temperature voltage Vf having a negative temperature coefficient are compared in the comparator 21. Therefore, a fluctuation in detection temperature may be reduced.

As described above, according to the power supply integrated circuit including the overheat protection circuit of the fourth embodiment, the inverting input terminal of the comparator 21 is connected to the source terminal of the NMOS transistor 12, to thereby reduce a fluctuation in detection temperature.

Note that, the embodiments of the present invention have each described the case where a diode is used as a thermal element, but the thermal element is not limited to a diode as long as the element exhibits similar temperature characteristics. For example, a bipolar transistor having a diode connection may be used.

What is claimed is:

1. An overheat protection circuit for detecting an increase in temperature to protect a circuit from overheating, comprising:

a p-n junction element for outputting a forward voltage that is proportional to temperature;

a reference voltage circuit that comprises transistors, each transistor operating in a weak inversion region; and a voltage comparator circuit for comparing the forward voltage of the p-n junction element with an output voltage of the reference voltage circuit;

wherein the reference voltage circuit comprises:

a current generation circuit comprising:

a first MOS transistor including a source terminal connected to a ground terminal;

a second MOS transistor including a source terminal connected to the ground terminal, and a gate terminal connected to a drain terminal of the first MOS transistor, the second MOS transistor having the same conductivity type as the first MOS transistor; and a first resistive element connected between a gate terminal and the drain terminal of the first MOS transistor;

a current mirror circuit connected to the current generation circuit; and a second resistive element including one terminal connected to the current mirror circuit and another terminal connected to the ground terminal, the second resistive element having the same temperature coefficient as the first resistive element, the one terminal serving as a first temperature voltage output terminal, and wherein the first MOS transistor and the second MOS transistor each operate in a weak inversion region.

2. An overheat protection circuit according to claim 1, wherein the p-n junction element comprises a diode that includes an anode terminal connected to the current mirror circuit and a cathode terminal connected to the ground terminal, the anode terminal serving as a second temperature voltage output terminal.

3. An overheat protection circuit according to claim 1, wherein the p-n junction element comprises a diode that includes an anode terminal connected to the current mirror circuit and a cathode terminal connected to the ground terminal, the anode terminal serving as a second temperature voltage output terminal.

4. An overheat protection circuit according to claim 1, wherein the voltage comparator circuit has hysteresis characteristics between a temperature at which an output voltage of the voltage comparator circuit is inverted when temperature increases and a temperature at which the output voltage of the voltage comparator circuit is inverted when the temperature decreases.

5. A power supply integrated circuit, comprising the overheat protection circuit according to claim 1.

* * * * *